(No Model.) 3 Sheets—Sheet 1.
W. A. LORENZ & W. H. HONISS.
PAPER BAG MACHINE.
No. 331,721. Patented Dec. 1, 1885.
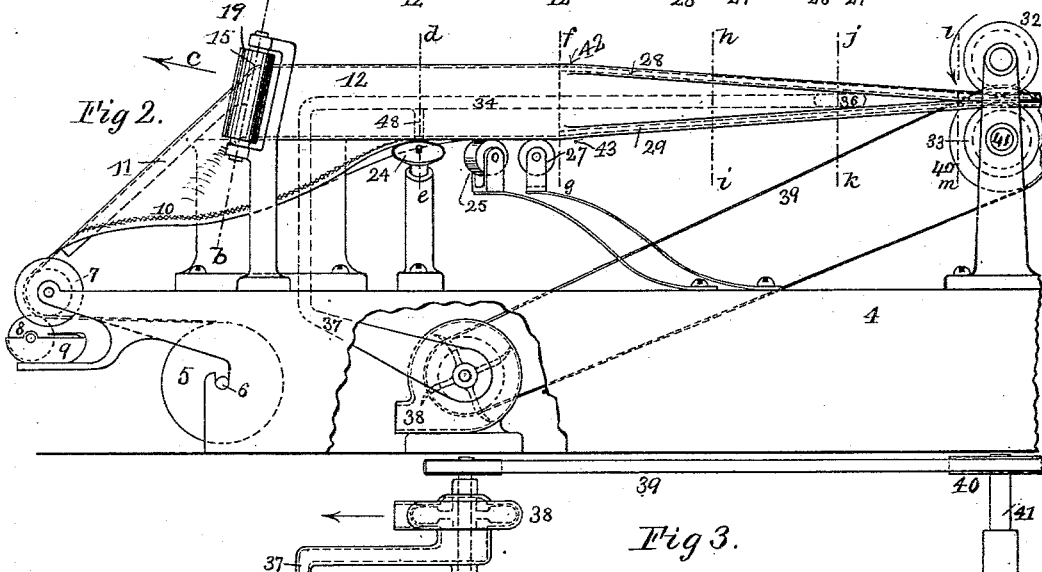
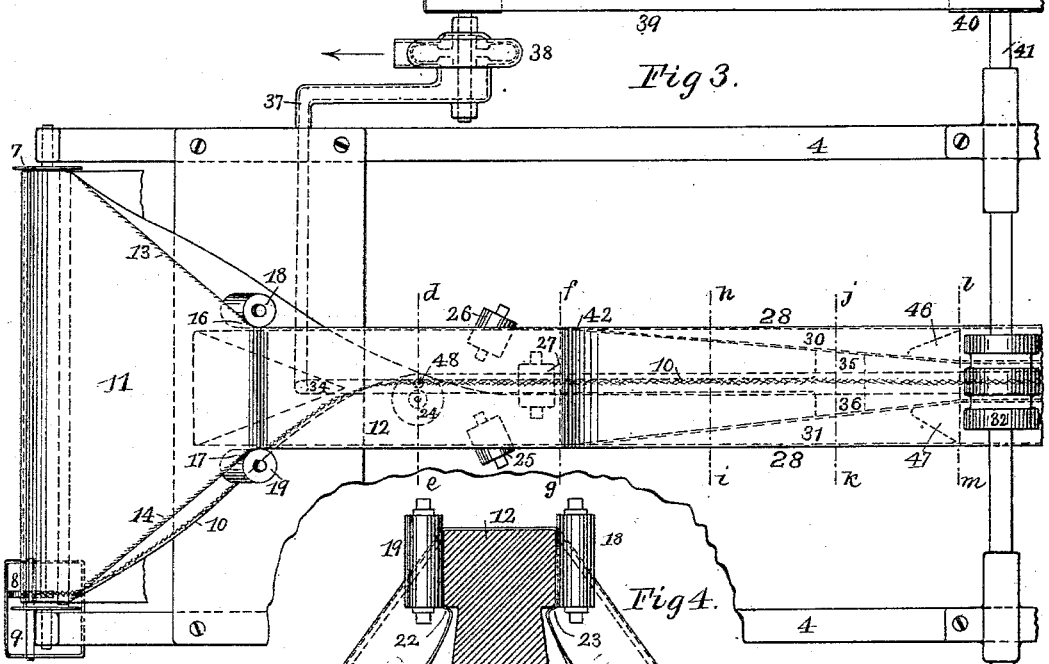
Witnesses:
S. W. Powel
Geo Hays
Inventors:
William A. Lorenz
William H. Honiss (No Model.) 3 Sheets—Sheet 2.
W. A. LORENZ & W. H. HONISS.
PAPER BAG MACHINE.
No. 331,721. Patented Dec. 1, 1885.
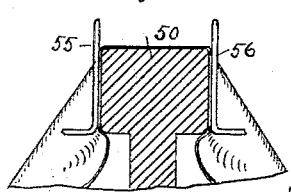
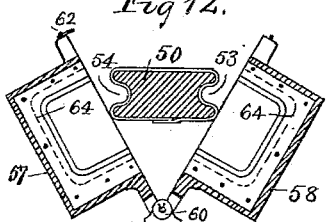
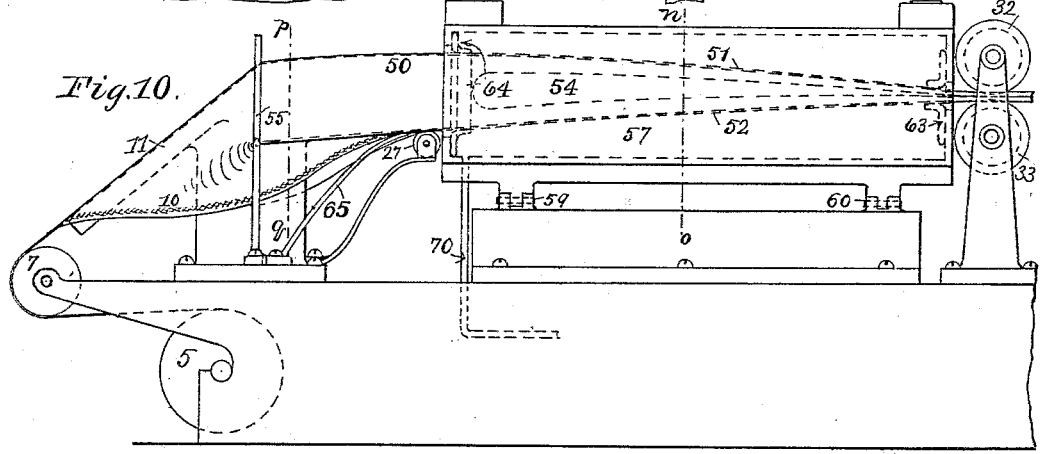
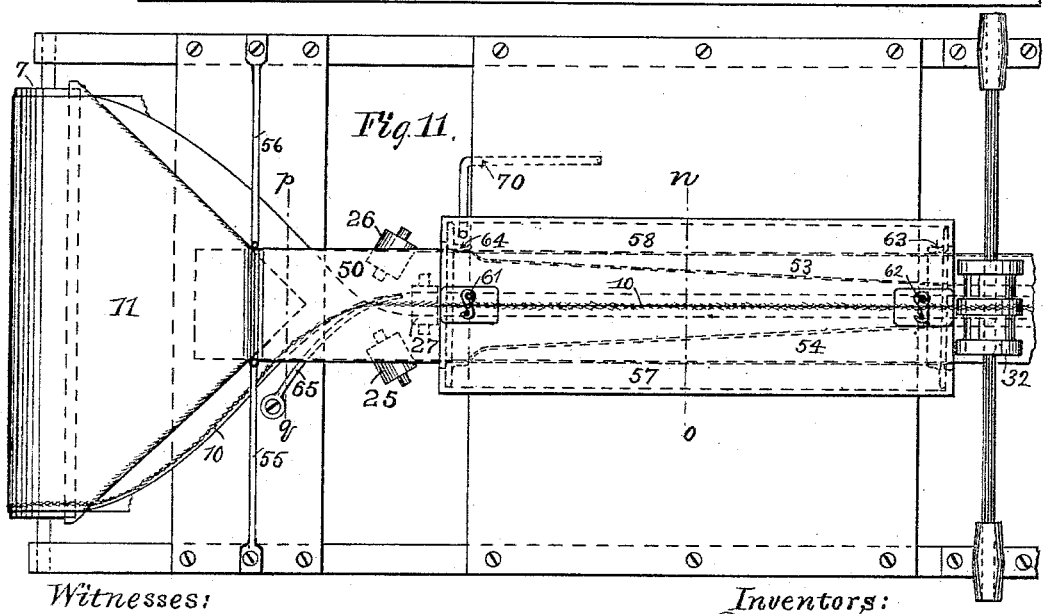
Witnesses:
S. W. Powel
Geo Hays.
Inventors:
William A. Lorenz,
William H. Honiss.

(No Model.) 3 Sheets—Sheet 3.
W. A. LORENZ & W. H. HONISS.
PAPER BAG MACHINE.
No. 331,721. Patented Dec. 1, 1885.
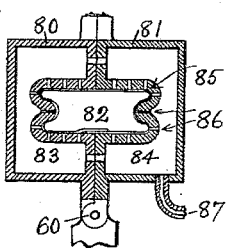
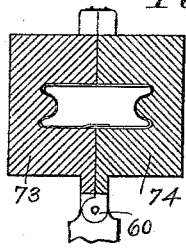
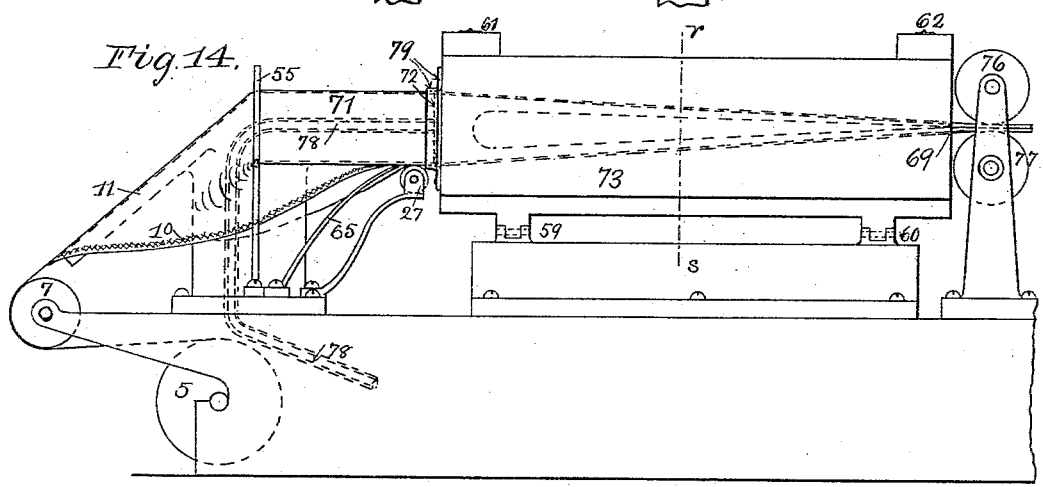
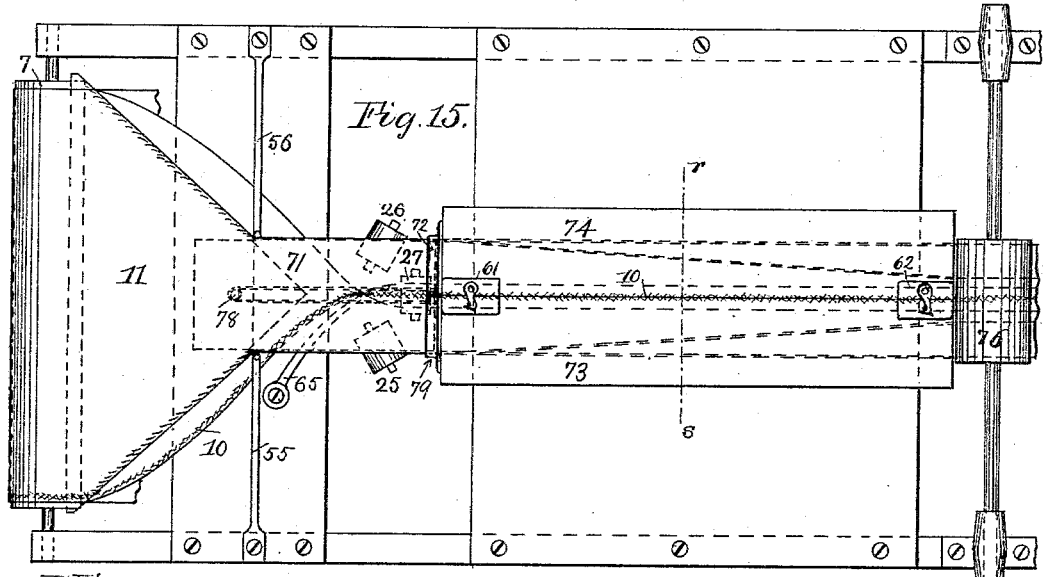
Witnesses:
S. W. Powel
Geo. Hays.
Inventors:
William A. Lorenz.
William H. Honiss.

UNITED STATES PATENT OFFICE.

WILLIAM A. LORENZ AND WILLIAM H. HONISS, OF HARTFORD, CONNECTICUT, ASSIGNORS TO FELIX W. LEINBACH AND CLARENCE A. WOLLE, BOTH OF BETHLEHEM, PENNSYLVANIA.

PAPER-BAG MACHINE.

SPECIFICATION forming part of Letters Patent No. 331,721, dated December 1, 1885.

Application filed July 16, 1883. Serial No. 100,972. (No model.)

*To all whom it may concern:*

Be it known that we, WILLIAM A. LORENZ and WILLIAM H. HONISS, citizens of the United States, residing at Hartford, in the county of Hartford and State of Connecticut, have invented new and useful Improvements in Paper-Bag Machines, of which the following is a specification.

Our invention relates to improvements in paper-bag machines for forming a continuous tucked tube from a roll of paper, the object being to produce a tube of uniform and unvarying size, with tucks of even depth, and with unbroken corners, and with a centrally-pasted lap, as nearly perfect as possible, and to provide for these results by the use of air-pressure, and by the assistance of guiding and forming devices. We attain these objects by the mechanisms illustrated in the accompanying drawings, in which—

Figure 1, Sheet 1, represents a cross-section of a tucked tube. Fig. 2 is a side view of our improved tube-forming mechanism complete. Fig. 3 is a plan of the same. Fig. 4 is a section of the former at the line $a\,b$ of Fig. 2, looking in the direction of the arrow $c$. Figs. 5, 6, 7, 8, and 9 are sections at the lines $d\,e$, $f\,g$, $h\,i$, $j\,k$, and $l\,m$, respectively, of Fig. 2. Fig. 10, Sheet 2, represents a side view of a modification of the tube-forming device. Fig. 11 is a plan of the same. Fig. 12 is a section of the device at the line $n\,o$ of Fig. 10, showing the air-box opened up. Fig. 13 is a section of the former at the line $p\,q$ of Fig. 10, showing the guiding-rods and part of the apron. Fig. 14, Sheet 3, is a side view of another modification of the tube-forming device. Fig. 15 is a plan of the same. Fig. 16 is a cross-section thereof on the line $r\,s$ of Fig. 14. Fig. 17 is a section of another modification of the tube-forming device.

Similar letters refer to similar parts throughout the several views.

In Fig. 1, Sheet 1, is shown a section of a tucked tube in which 1 2 are the tucks, and 3 the lap where the tube is joined by paste.

In Figs. 2 and 3 the frame-work of the machine is shown at 4, in which is mounted a roll of paper, 5, on shaft 6. This paper is passed over a roller, 7, where a paste-roller, 8, receiving paste from a dish, 9, deposits a line of paste near one edge of the paper, as indicated by the cross-hatched line 10. From the roll 7 the paper passes up an inclined apron, 11, which is tapered and reduced in width as it approaches the box-shaped part 12 of the forming device, or "former," as it is technically termed. The tapering sides 13 and 14 of the apron 11 are rounded a little, allowing the paper to pass over without breaking its surface. At the junction of the apron 11 and the box part 12 of the former the surface is rounded, as seen at 15 in Fig. 2, and also at the sides, as seen at 16 and 17 in Fig. 3, while the edges of the meeting surfaces or corners of 15, 16, and 17 are rounded a little.

In the corners 16 and 17 are placed rollers 18 and 19 in fixed stands. (Shown only in Fig. 2.) These rolls are preferably placed at an angle to direct the course of the paper downward; but they may be placed vertically. The function of these rolls 18 and 19 is to pass the paper from the apron 11 to the sides of the box-shaped part 12 of the former without breaking a sharp crease in the paper, and also to define, by means of the lower edges of the two rolls, both the lower corners of the box part of the tube. (Seen better at 22 and 23 in Fig. 4.) This defining of the lower corners of the tube allows the paper to be drawn together under the former by the assistance of a tucking-in roll, 24, set preferably at an angle, as seen at 24 in Fig. 5, and also by the assistance of two guide-rolls, 25 and 26, which are mounted on springs. (Shown only in Fig. 2.) The two guide-rolls are set preferably at an angle to direct the course of the paper inward. The two edges of the paper lap over one another in front of the spring-mounted roll 27, which presses and unites the laps by means of the line of paste 10. We have thus produced a box-shaped tube with rounded corners. (Seen more clearly in Fig. 6 in section.) Commencing at the line $f\,g$, the former is altered in shape, being reduced in thickness (see Fig. 2) by the converging of the upper and lower surfaces, where plates 28 and 29 are used. These latter keep the full width of the box part 12 of the former, as seen in Fig. 3. Between the plates 28 and 29 the sides of the former are tapered from the box part 12 at line $f\,g$ to the end of the former at line $l\,m$, as seen at 30 and 31, Fig. 3, thus forming recesses. The bottoms of these recesses are flat surfaces preferably, but may be concave in shape, or may be cut away farther in. The paper tube, when pasted together in the box shape, is now passed on the converging plates 28 and 29, and the sides of the tube are directed into the recesses at either side of the former to produce the tucks, and then the tube is passed between a pair of drawing-rolls, 32 and 33.

In order to hold the paper to the former and produce tucks of unvarying depth, we utilize air-pressure in the following manner: The former is provided with a pipe, 34, or may be hollow throughout its entire length. This pipe 34 communicates at one end with the tuck-recesses by means of openings 35 and 36, and at its other end with a pipe, 37, connected to an exhaust-fan, 38, driven by a belt, 39, from pulley 40 on shaft 41. By the motion of the fan 38 a partial vacuum is created in the tuck-recesses, causing the outside air-pressure to hold the paper closely to the former all along the tuck-recesses, and it will cause the paper tube to be delivered to the drawing-rolls with uniform depth of tucks.

The manner in which the paper keeps to the former is illustrated in Figs. 7, 8, and 9. The plates 28 and 29 are curved at 42 and 43, Fig. 2, to prevent creases forming in the paper as the tube passes from the box part 12 of the former to the converging part. The edges of the plates are rounded, as seen at 44 and 45, Fig. 7. The front ends of the plates are cut out, as seen at 46 and 47, Fig. 9, to allow the bottom of the tucks to assume a rounded shape. If preferred, these rounded edges may be broken into sharper corners and flattened by the drawing-rolls. When the line of paste 10 approaches the tucking-in roll 24, the paper, with its paste, is liable to sag and deposit paste on the roll. To prevent this, a small hole, 48, is made in the former 12 over the roller 24, which hole communicates with the vacuum-chamber 34, causing the paper to keep up against the former.

Figs. 10 and 11, Sheet 2, show a modification of the tube-forming device employing air-pressure exerted outside of the tube-former to form the tucks. Herein the former 50 is constructed in a different manner than the box-shaped former 12 in Figs. 2 and 3, Sheet 1. The upper and lower surfaces, 51 and 52, Fig. 10, Sheet 2, are curved or bowing, while the tuck-recesses 53 and 54 in the sides of the former extend about two-thirds the length of the former, and are rounded, as seen in section in Fig. 12. The paper from roll 5, Fig. 10, is passed around a roller, 7, and receives a line of paste, 10, in a similar manner before illustrated, and the paper then passes upon the apron 11, being guided from thence to the former proper by guiding-rods 55 and 56. (Shown also in Fig. 13.) The edges of the paper are then lapped in front of the presser-roll 27, and are joined, as before described, a guiding-finger, 65, serving to tuck in the inner lap of paper.

Extending along about two-thirds of the length of the former 50, and encircling it, is shown an air-box made in halves 57 and 58. (Shown opened in Fig. 12.) This air-box is hinged at 59 and 60, and is clamped together by hooks 61 and 62. The box does not touch the former 50 at the ends, and in order to make a partially air-tight joint elastic strips 63 and 64, of leather or other material, are fastened to the box 57 and 58, which strips bear upon the paper passing over the former. A pipe, 70, communicating with a fan (not shown) leads to the air-box. A blast of air forced into the air-box compresses the air therein and forces the paper to keep closely to the former all along the tuck-recesses within the box, as at 53 and 54. A part of the compressed air may escape near the drawing-rolls 32 and 33, though the paper tube may be inclosed fully up to the drawing-rolls. The box is hinged, and is made in halves to get at the paper and start it upon the former through the box when commencing to operate the machine.

While it is preferable to form the paper into a box or tube shape and paste its laps together before passing it to the tuck-recessed part of the former, we find by experiment that the lapping and pasting together can be done a little beyond the box-shaped part of the former without affecting the accuracy of the tube.

We have described in the foregoing the formation of a tucked tube around the outside of a former by the use of air-pressure and other devices.

By a modification of the former we attain the same object in the following manner: Referring to Figs. 14 and 15, Sheet 3, the paper roll 5, roller 7, apron 11, guide-rods 55, 56, and 65, and rollers 25, 26, and 27 are all represented as in Figs. 10 and 11, and the paper is formed and pasted into a tube around the former 71, as before described. This former 71 ends abruptly at 72. From here on the former, with its tuck-recesses, is omitted, and in its place is arranged a box in halves, 73 and 74, hinged at 59 and 60, and held together at 61 and 62. This box is cut out inside, so as to conform to the front part of the former 50 and tuck-recesses 53 54, (seen better in section in Fig. 16,) thus making a die-shaped former. In front of the drawing-rolls 76 and 77, at 69, the hollow former 73 and 74 conforms to the shape of a tucked tube, Fig. 1, Sheet 1, fitting this tube outside. Inside the former 71, Sheet 3, Figs. 14 and 15, is a pipe, 78, communicating with a fan, (not shown,) by means of which air can be pumped into the die-shaped former 73 74. When the paper tube made on the former 71 is drawn through the former 73 74 and passed to the rolls 76 and 77, and air is driven inside the paper tube, it will be distended, and will thus conform to the shape of the die-shaped former, thus delivering a tucked tube, as desired.

In order to make a partially air-tight joint between the former 71 and hollow former 73 74, elastic strips 79, of leather or other material, are fastened to halves 73 and 74, which bear on the paper as it enters the die-shaped former.

By still another modification this die-shaped former will produce a tucked tube, as desired. Fig. 17 is a section of this modification. Here a die-shaped former, 80 and 81, in halves, is hinged and held, as before described. In length and position it is similar to the die-shaped former 73 74, Figs. 14 and 15. Instead of making the former 80 81, Fig. 17, solid outside of the internal tube-recess, 82, it is made hollow, as at 83 and 84, and the tube-recess 82 is surrounded by a perforated former, 85, the holes being shown at 86 86, thus making a die-shaped former. A pipe, 87, communicating with a fan, (not shown,) permits the air to be exhausted from the box 83 and 84, thus drawing the paper tube closely to the die-shaped former and producing a tucked tube in a similar manner as that described before.

We do not confine either of our claims to the particular form shown of any of the devices or combinations described. We find by actual test that the described formers admit of various modifications in section and in length, and the constructer may change the proportions and appearance of many of the parts without affecting the substantial identity of the invention.

We do not herein claim a hollow former operating without any aid from pneumatic pressure to give a tucked shape to a paper tube drawn through that former, because such a former is the subject of an application of William A. Lorenz for Letters Patent of the United States of America, filed June 16, 1884, Serial No. 134,991.

We claim as our joint invention—

1. A former for making tucked paper tubing, constructed substantially as described, and combined with pneumatic mechanism, substantially as described, for forcing the walls of the tubing into substantial conformity with the shape of the former.

2. The combination of the former having the pipe 34 and the openings 35 and 36, with mechanism for exhausting air from that pipe.

3. The combination of a former having a rectangular ungrooved part corresponding in cross-section with the untucked paper tube formed thereon, with the rolls 18 and 19, for guiding the paper to the former, and for defining the two lower corners of the rectangular untucked paper tube, all substantially as described.

4. The combination of a former having a rectangular ungrooved part corresponding in cross-section with the untucked paper tube formed thereon, with the inclined apron 11, joined to that former at the curved surfaces 15, 16, and 17, and with the rolls 18 and 19, for guiding the paper from the apron to the former, and for defining the two lower corners of the rectangular untucked paper tube, all substantially as described.

WILLIAM A. LORENZ.
WILLIAM H. HONISS.

Witnesses:
ALBERT H. WALKER,
JOHN P. GRAFF.